US010265853B2

(12) United States Patent
Murakami

(10) Patent No.: US 10,265,853 B2
(45) Date of Patent: Apr. 23, 2019

(54) LASER WELDING SYSTEM

(71) Applicant: FANUC CORPORATION, Yamanashi (JP)

(72) Inventor: Yoshinori Murakami, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/696,258

(22) Filed: Sep. 6, 2017

(65) Prior Publication Data
US 2018/0065250 A1 Mar. 8, 2018

(30) Foreign Application Priority Data
Sep. 8, 2016 (JP) .................. 2016-175836

(51) Int. Cl.
B25J 9/16 (2006.01)
B23K 26/082 (2014.01)
(Continued)

(52) U.S. Cl.
CPC ........... B25J 9/1651 (2013.01); B23K 26/042 (2015.10); B23K 26/082 (2015.10);
(Continued)

(58) Field of Classification Search
CPC .............. B23K 26/042; B23K 26/0884; B23K 26/046; B23K 26/082; B25J 9/1651;
(Continued)

(56) References Cited

U.S. PATENT DOCUMENTS 4,638,143 A * 1/1987 Akeel ................ B23K 26/0884
219/121.63
2001/0033146 A1* 10/2001 Kato ...................... B25J 9/1641
318/568.22
(Continued)

FOREIGN PATENT DOCUMENTS

CN 101043198 A 9/2007
CN 102501242 A 6/2012
(Continued)

OTHER PUBLICATIONS

An Office Action issued by the Chinese Patent Office (SIPO) dated Oct. 24, 2018, which corresponds to Chinese Patent Application No. 201710797262.9 and is related to U.S. Appl. No. 15/696,258; with partial English language translation.

Primary Examiner — Dale Moyer
(74) Attorney, Agent, or Firm — Studebaker & Brackett PC

(57) ABSTRACT

To provide a laser welding system that can correct divergence of a laser beam irradiation position with higher precision, and is capable of higher precision laser welding. A remote laser welding system (1) includes: a multi-axis robot (3); a laser head (5) provided to a leading end of an arm (31) of the multi-axis robot (3); a control unit (7) that controls operations of the multi-axis (3) and the laser head (5); and a laser light source (53), in which the laser head (5) includes: two galvano mirrors (51, 52) configured to be rotatable about rotational axes (X1, X2), respectively, and reflect a laser beam; and galvano motors (54) that rotationally drive the galvano mirrors (51, 52), and in which the control unit (7) includes an acceleration sensor (73) that acquires the acceleration of the vibration; and a command correction section (74) that corrects a control command to the galvano motors (54) which rotationally drive the galvano mirrors (51, 52), based on the acceleration of the vibration
(Continued)

acquired by the acceleration sensor (73), so as to suppress divergence of the laser beam irradiation position due to vibration.

4 Claims, 7 Drawing Sheets

(51) Int. Cl.
*B23K 26/70* (2014.01)
*B25J 13/08* (2006.01)
*B23K 26/042* (2014.01)
*B23K 26/08* (2014.01)

(52) U.S. Cl.
CPC ........ *B23K 26/0884* (2013.01); *B23K 26/702* (2015.10); *B23K 26/707* (2015.10); *B25J 9/1641* (2013.01); *B25J 13/088* (2013.01); *G05B 2219/37432* (2013.01); *G05B 2219/39195* (2013.01); *G05B 2219/40549* (2013.01); *G05B 2219/45104* (2013.01)

(58) Field of Classification Search
CPC ......... B25J 13/088; G05B 2219/45104; G05B 2219/39195; G05B 2219/40547; G05B 2219/40549; G05B 2219/45138
See application file for complete search history.

(56) References Cited

U.S. PATENT DOCUMENTS

| | | | | |
|---|---|---|---|---|
| 2004/0206735 | A1* | 10/2004 | Okuda | B23K 26/04 219/121.78 |
| 2007/0075055 | A1* | 4/2007 | Komatsu | B23K 26/04 219/121.63 |
| 2012/0296471 | A1* | 11/2012 | Inaba | B25J 9/163 700/253 |
| 2018/0169856 | A1* | 6/2018 | Murakami | B25J 9/161 |

FOREIGN PATENT DOCUMENTS

| | | | |
|---|---|---|---|
| CN | 104117772 A | 10/2014 | |
| CN | 207127389 U | 3/2018 | |
| DE | 102007035485 A1 * | 1/2009 | ........... B23K 26/046 |
| JP | 2004-314137 A | 11/2004 | |
| JP | 2007-021551 A | 2/2007 | |
| JP | 2008-000801 A | 1/2008 | |
| JP | 2012-027446 A | 2/2012 | |
| JP | 4923459 B2 | 4/2012 | |

* cited by examiner

LASER WELDING SYSTEM

This application is based on and claims the benefit of priority from Japanese Patent Application No. 2016-175836, filed on 8 Sep. 2016, the content of which is incorporated herein by reference.

BACKGROUND OF THE INVENTION

Field of the Invention

The present invention relates to a laser welding system.

Related Art

Conventionally, a laser welding device including a laser head having a galvanoscanner at the leading end of an arm of a multi-axis robot has been known. Herein, galvanoscanner is a device including two mirrors which are rotable about two rotation axes orthogonal to each other, respectively, and scans a laser beam emitted from a laser light source by rotationally driving these mirrors by servomotors.

However, with the above-mentioned laser welding device, since vibrations occur at the leading end of the arm during operation of the robot, it is necessary to correct for divergence in the laser beam irradiation position due to this vibration. Normally, the robot includes a vibration control function, and suppresses vibration by detecting the vibrations occurring at the leading end of the arm by way of an acceleration sensor provided to the leading end of the arm, and adding the reverse torque to the servomotor or reduction gears driving each axis so as to suppress the detected vibrations. For this reason, although correcting the divergence of the laser beam irradiation position using the vibration control function of the robot has been considered, in this case, the load on the servomotor and reduction gears possessed by the robot will be great.

Therefore, a laser welding device has been proposed that detects the angular divergence between the laser beam actually irradiated to the laser beam irradiation position from the laser head and the laser beam that should be irradiated to the target welding point by a gyrosensor, and corrects operation of the galvanoscanner based on the detected angular divergence (for example, refer to Patent Document 1).

Patent Document 1: Japanese Patent No. 4923459

SUMMARY OF THE INVENTION

However, the laser welding device of Patent Document 1 detects only the slope of the laser beam relative to the welding point with the gyrosensor to correct operation of the galvanoscanner. For this reason, the lateral divergence, etc. occurring when the robot vibrates is in no way considered, and thus it is not possible to correct for divergence of the laser beam irradiation position with high precision.

The present invention has been made taking account of the above, and the object thereof is to provide a laser welding system that can correct for divergence of the laser beam irradiation position with high precision, and thus is capable of higher precision laser welding.

In order to achieve the above-mentioned object, a first aspect of the present invention provides a laser welding system (e.g., the remote laser welding system 1, 1A, 1B, 1C described later) comprising a robot (e.g., the multi-axis robot 3 described later), a laser head (e.g., the laser head 5 described later) provided to a leading end of an arm (e.g., the arm 31 described later) of the robot, a control unit (e.g., the control unit 7, 7A, 7B, 7C described later) that controls operations of the robot and the laser head, and a laser light source (e.g., the laser light source 53 described later) that generates a laser beam, in which the laser head includes: at least one mirror (e.g., the galvano mirror 51, 52 described later) which is configured to be rotatable around a rotation axis (e.g., the rotation axis X1, X2 described later), and reflects the laser beam; and a motor (e.g., the galvano motor 54 described later) the rotationally drives the mirror, and in which the control unit includes: an acceleration acquisition section (e.g., the acceleration sensor 73, electric current sensor 73A, image processing unit 73B and imaging device 75 constituting the acceleration acquisition section described later) that acquires acceleration of vibration occurring at the leading end of the arm due to operation of the robot; and a command correction section (e.g., the command correction section 74 described later) that corrects a control command to the motor which rotationally drives the mirror so as to suppress divergence of a laser beam irradiation position due to the vibration, based on the acceleration of the vibration acquired by the acceleration acquisition section.

According to a second aspect of the present invention, the laser welding system as described in the first aspect may further include an acceleration sensor that is provided to the leading end of the arm of the robot, and detects acceleration of vibration occurring at the leading end of the arm, in which the acceleration acquisition section may be configured by the acceleration sensor.

According to a third aspect of the present invention, the laser welding system as described in the first aspect may further include an electric current sensor that detects drive current of the motor driving the robot, in which the acceleration acquisition section may be configured to include the electric current sensor, and calculates the acceleration of the vibration from the drive current detected by the electric current sensor.

According to a fourth aspect of the present invention, the laser welding system as described in the first aspect may further include: an imaging device that captures an image of the robot, or the robot and surrounding thereof; and an image processing unit that processes an image captured by the imaging device, in which the acceleration acquisition section may be configured to include the imaging device and the image processing unit, and calculates the acceleration of the vibration from a change in images captured every predetermined time period.

According to a fifth aspect of the present invention, the laser welding system as described in any one of the first to fourth aspects may further include a recording unit that acquires in advance and records the acceleration of the vibration, in which the command correction section may correct a control command to the motor which rotationally drives the mirror, based on the acceleration of the vibration recorded in advance in the recording unit.

According to the present invention, it is possible to provide a laser welding system that can correct for divergence of the laser beam irradiation position with high precision, and thus is capable of higher precision laser welding.

DETAILED DESCRIPTION OF THE INVENTION

Hereinafter, embodiments of the present invention will be explained by referencing the drawings. It should be noted that, in the explanations of the second and later embodiments, the same reference symbols will be assigned to configurations shared with the first embodiment, and explanations thereof will be omitted.

First Embodiment

Figure 1:
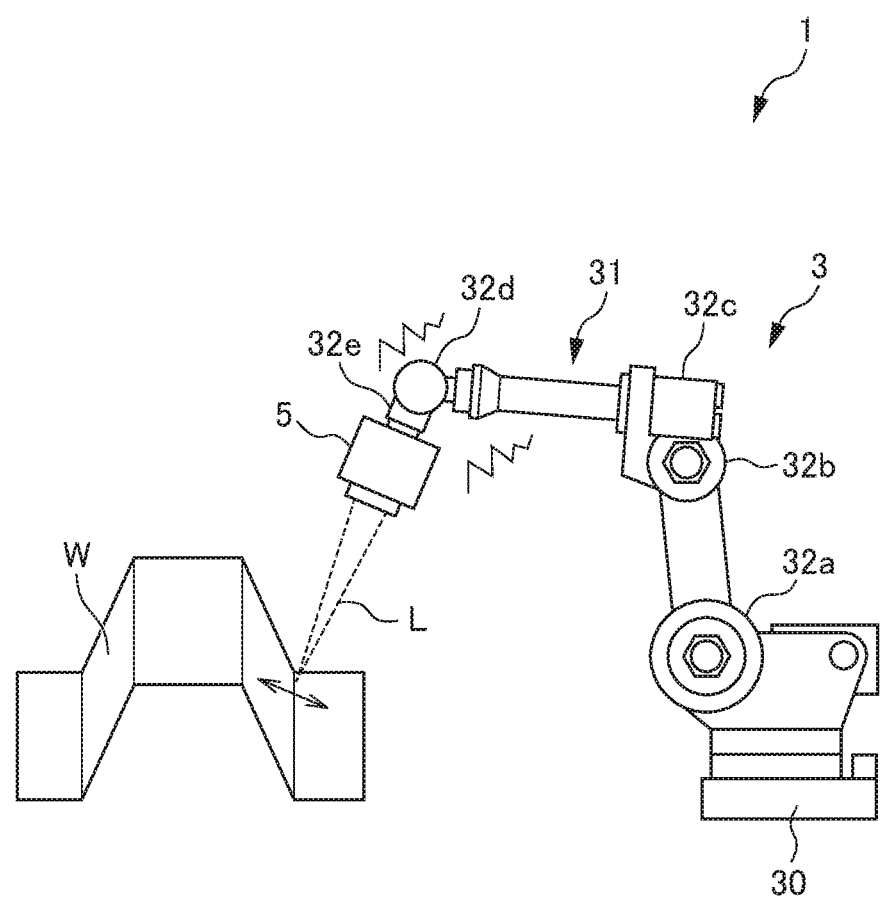
FIG. 1 is an exterior view of a laser welding system according to a first embodiment.

FIG. 1 is an exterior view of a remote laser welding system 1 according to a first embodiment. As shown in FIG. 1, the remote laser welding system 1 according to the present embodiment includes: a multi-axis robot 3, a laser head 5 provided to a leading end of an arm 31 of the multi-axis robot 3, a control unit 7 described later which controls these, and a laser light source 53 described later which generates a laser beam L. This remote laser welding system 1 executes laser welding by irradiating the laser beam L from the laser head 5 towards the processing point (welding point) of a workpiece W such as an automobile body, while conveying the laser head 5 on the leading end of the arm 31 by way of operation of the multi-axis robot 3.

The multi-axis robot 3 includes a base 30, the arm 31, a plurality of axes 32a to 32e, and robot motors (not illustrated) consisting of servomotors which drive each axis. For the multi-axis robot 3, the operation thereof is controlled by a robot control unit described later.

The laser head 5 includes a galvanoscanner 50 for scanning the laser beam L towards a processing point (welding point) on the workpiece W. For the galvanoscanner 50, operation thereof is controlled by a galvanoscanner control unit described later.

Figure 2:
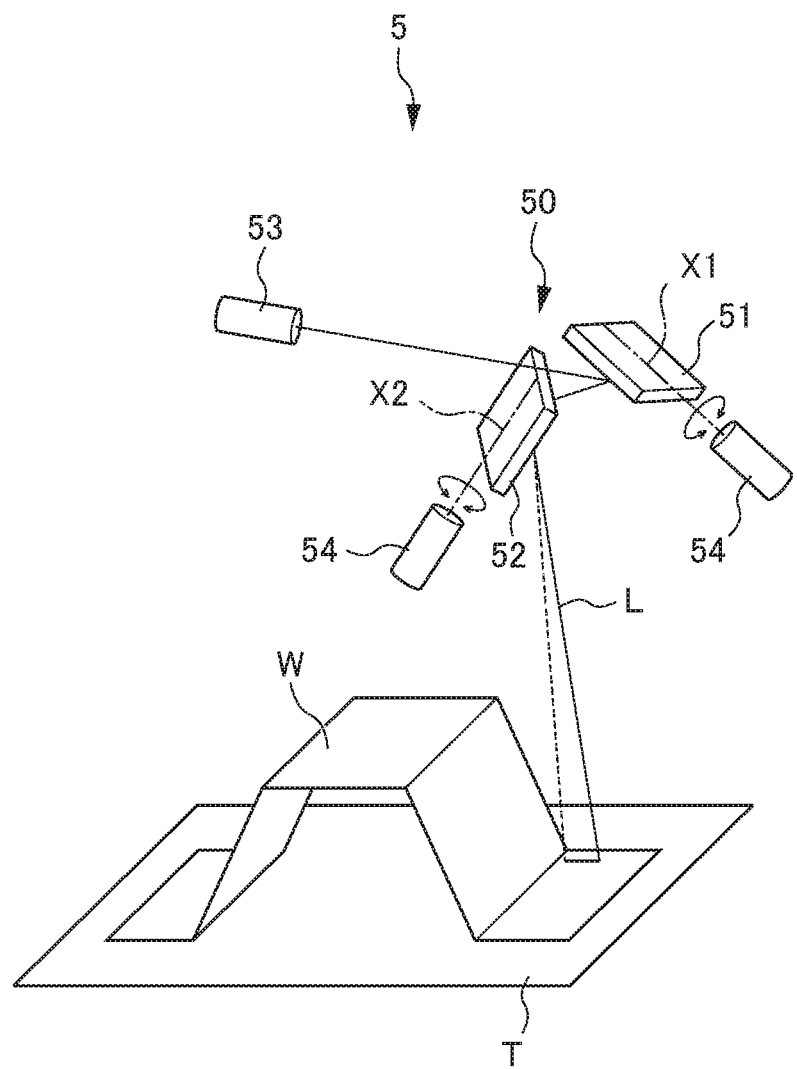
FIG. 2 is a view showing the optical system of the laser welding system according to the first embodiment.

FIG. 2 is a view showing the optical system of the remote laser welding system 1. FIG. 2 schematically shows the laser light source 53 and galvanoscanner 50. As shown in FIG. 2, the laser light source 53 and galvanoscanner 50 are arranged above the workpiece W placed on a work table T.

The laser light source 53 is configured by various laser oscillators including a laser medium, optical resonator, excitation source, etc. The laser light source 53 irradiates the generated laser beam L towards the galvanoscanner 50 described later.

The galvanoscanner 50 includes the two galvano mirrors 51, 52 to which the laser beam L emitted by the laser light source 53 is reflected in order; and the two galvano motors 54, 54 which rotationally drive each of the galvano mirrors 51, 52 about the rotation axes X1, X2, respectively. The galvano mirrors 51, 52 are configured to be rotatable about the two rotation axes X1, X2, respectively, which are orthogonal to each other. The galvano motors 54, 54 are configured by servomotors, and scan the laser beam L emitted from the laser light source 53, by rotationally driving the galvano mirrors 51, 52.

As shown in FIG. 2, the laser beam L emitted by the laser light source 53 reaches the processing point (welding point) on the workpiece W after being sequentially reflected by the two galvano mirrors 51, 52. At this time, when rotationally driving the two galvano mirrors 51, 52 by way of the galvano motors 54, 54, respectively, the incident angle of the laser beam L incident on these galvano mirrors 51, 52 continuously changes. As a result thereof, the laser beam L reaching the workpiece W will be scanned along a predetermined scanning path on the workpiece W.

Figure 3:
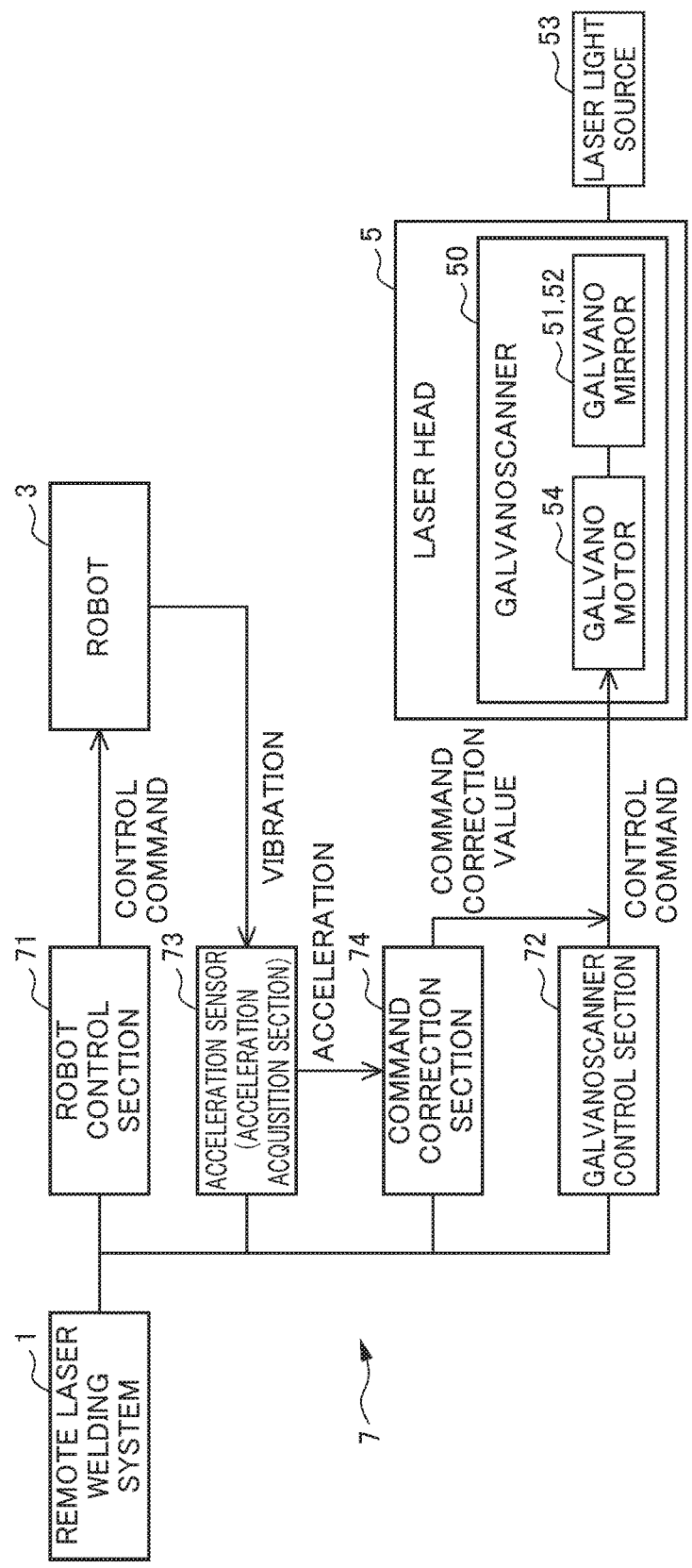
FIG. 3 is a functional block diagram of the laser welding system according to the first embodiment.

FIG. 3 is a functional block diagram of the remote laser welding system 1 according to the present embodiment. As shown in FIG. 3, the remote laser welding system 1 is configured mainly by the multi-axis robot 3 and laser head 5, control unit 7 which controls these, and the laser light source 53. In addition, the control unit 7 includes a robot control section 71, galvanoscanner control section 72, acceleration sensor 73 as an acceleration acquisition section, and a command correction section 74.

The robot control section 71 drives each axes 32a to 32e to convey the laser head 5 provided to the leading end of the arm 31 to a predetermined position, by controlling the aforementioned robot motors. The galvanoscanner control section 72 adjusts the incident angle of the laser beam L incident on the galvano mirrors 51, 52 by controlling the aforementioned galvano motors 54, 54. The irradiation position of the laser beam L is thereby adjusted.

The acceleration sensor 73 constitutes an acceleration acquisition section, and acquires the acceleration of vibrations occurring at the leading end of the arm 31 of the multi-axis robot 3. According to the acceleration detected by this acceleration sensor 73, the vibrations at the leading end of the arm 31 occurring due to operation of the multi-axis robot 3 are detected.

The command correction section 74 calculates a command correction value so as to suppress the divergence of the laser beam irradiation position due to vibration based on the acceleration of vibrations acquired by the acceleration sensor 73, and corrects the control commands to the galvano motors 54, 54 by way of the galvanoscanner control section 72, according to this command correction value. In other words, the command correction section 74 learns a vibration pattern based on the acceleration of vibrations detected and acquired by the acceleration sensor 73, and corrects operation of the galvanoscanner 50 based on this learning data. Herein, the method of correcting for divergence of the laser beam irradiation position due to vibration in the present embodiment will be explained by referencing FIG. 4.

Figure 4:
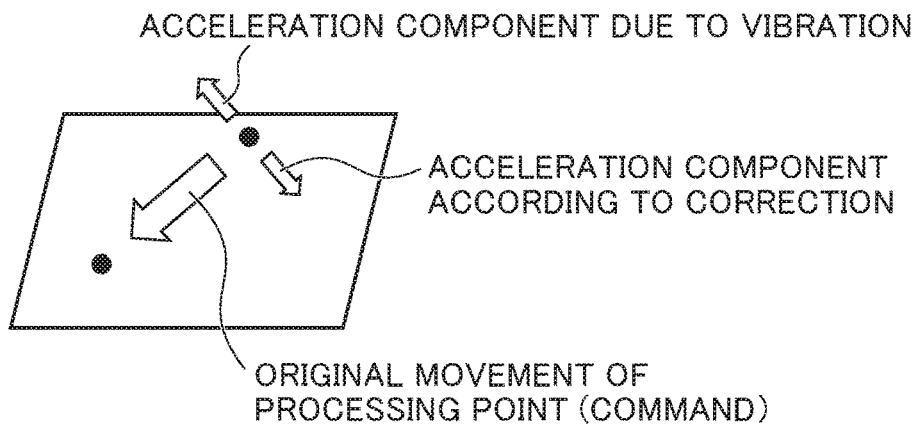
FIG. 4 is a view for explaining a method of correcting for divergence of a laser beam irradiation position due to vibration.

FIG. 4 is a view for explaining the method of correcting for divergence of the laser beam irradiation position due to vibration. As shown in FIG. 4, in the remote laser welding system 1, an acceleration component originating from vibrations occurring due to operation of the multi-axis robot 3 is added to the leading end of the arm 31 of the multi-axis robot 3 including the laser head 5. When this is done, divergence arises in the original movement (command) relative to the processing point (welding point) according to the control command from the robot control section 71. Therefore, in the present embodiment, the aforementioned command correction section 74 calculates an acceleration component in a reverse direction and same magnitude as the acceleration component due to vibration as a command correction value, and adds (superimposes) this command correction value to the control command. The acceleration component due to vibration is thereby counterbalanced by the acceleration component due to correction, whereby the vibration will be suppressed.

Figure 5:
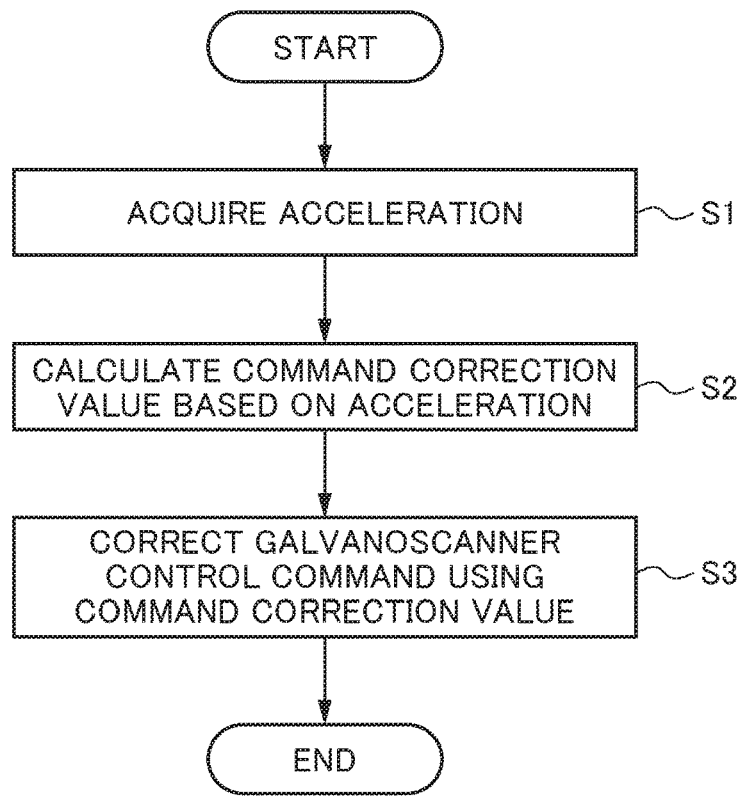
FIG. 5 is a flowchart showing a sequence of correcting for divergence of the laser beam irradiation position in the laser welding system according to the first embodiment.

The sequence of correcting for divergence of the laser beam irradiation position of the remote laser welding system 1 including the above configuration will be explained by referencing FIG. 5. FIG. 5 is a flowchart showing the sequence of correcting for divergence of the laser beam irradiation position in the remote laser welding system 1 according to the present embodiment. This correction processing is repeatedly executed while laser welding is being executed.

First, in Step S1, the acceleration of vibrations occurring at the leading end of the arm 31 due to operation of the multi-axis robot 3 is acquired. In the present embodiment, the acceleration of vibrations is detected and acquired by the acceleration sensor 73 serving as an acceleration acquisition section. Subsequently, the processing advances to Step S2.

In Step S2, the command correction value is calculated based on the acceleration of vibrations acquired in Step S1. More specifically, an acceleration component of the reverse direction and same magnitude as the acceleration component due to vibrations as mentioned above is calculated as the command correction value. Subsequently, the processing advances to Step S3.

In Step S3, the galvanoscanner control command is corrected using the command correction value calculated in Step S2. More specifically, this command correction value is added (superimposed) to the galvanoscanner control command as mentioned above. The acceleration component due to vibration is thereby counterbalanced by the acceleration component due to correction, whereby the vibration is suppressed. The present processing is thereby ended.

According to the present embodiment, the following effects are exerted. In the present embodiment, in the remote laser welding system 1 including the laser head 5 having the galvanoscanner 50 at the leading end of the arm 31 of the multi-axis robot 3, the acceleration sensor 73 that acquires the acceleration of vibrations occurring at the leading end of the arm 31 due to operation of the multi-axis robot 3 is provided. In addition, the command correction section 74 that corrects control commands to the galvano motors 54, 54 which rotationally drive the galvano mirrors 51, 52 is provided so as to suppress the divergence of the laser beam irradiation position due to vibration, based on the acceleration of vibrations acquired by the acceleration sensor 73. Since the acceleration component due to vibration can thereby be counterbalanced by the acceleration component according to correction, it is possible to reliably suppress vibrations occurring at the leading end of the arm 31. Therefore, according to the present embodiment, it is possible to correct for divergence of the laser beam irradiation position with higher precision, and thus higher precision laser welding is possible. It should be noted that, according to the present embodiment, due to correcting the galvanoscanner control command without correcting the robot control command by the robot control section 71, the load on the robot motor or reduction gears of the multi-axis robot 3 will not increase.

Second Embodiment

Figure 6:
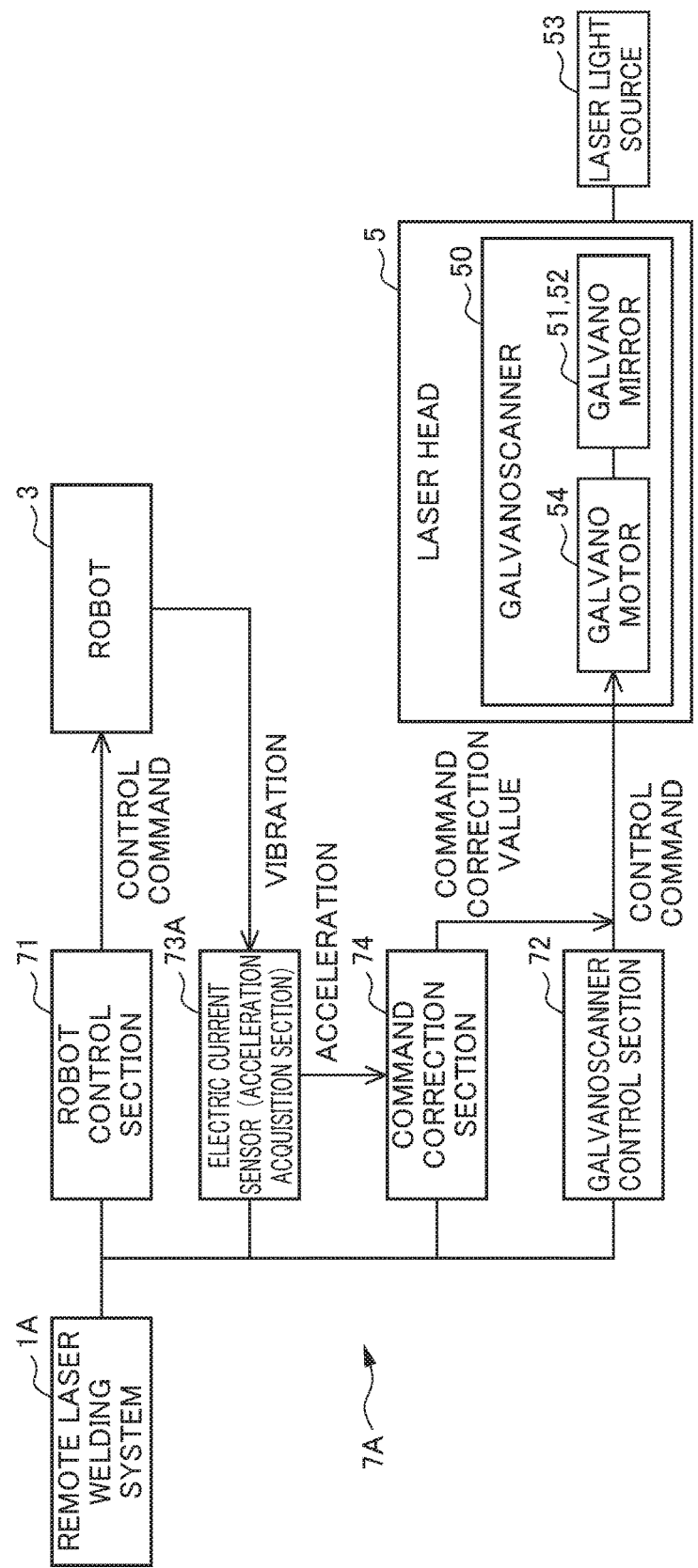
FIG. 6 is a functional block diagram of a laser welding system according to a second embodiment.

FIG. 6 is a functional block diagram of a remote laser welding system 1A according to a second embodiment. As shown in FIG. 6, the remote laser welding system 1A according to the present embodiment is the same configuration as the first embodiment, except for the configuration of the acceleration acquisition section of the control unit 7a differing compared to the remote laser welding system 1 according to the first embodiment. More specifically, the remote laser welding system 1A according to the present embodiment differs from the first embodiment in the point of including an electric current sensor 73A in place of the acceleration sensor 73, as the acceleration acquisition section.

The electric current sensor 73A is provided to the multi-axis robot 3, and detects the drive current of the robot motors driving each of the axes of the multi-axis robot 3. The acceleration acquisition section of the present embodiment thereby calculates and acquires the acceleration of vibrations, from the drive current detected by the electric current sensor 73A.

The remote laser welding system 1A according to the present embodiment operates similarly to the remote laser welding system 1 according to the first embodiment, and thus similar effects are exerted.

Third Embodiment

Figure 7:
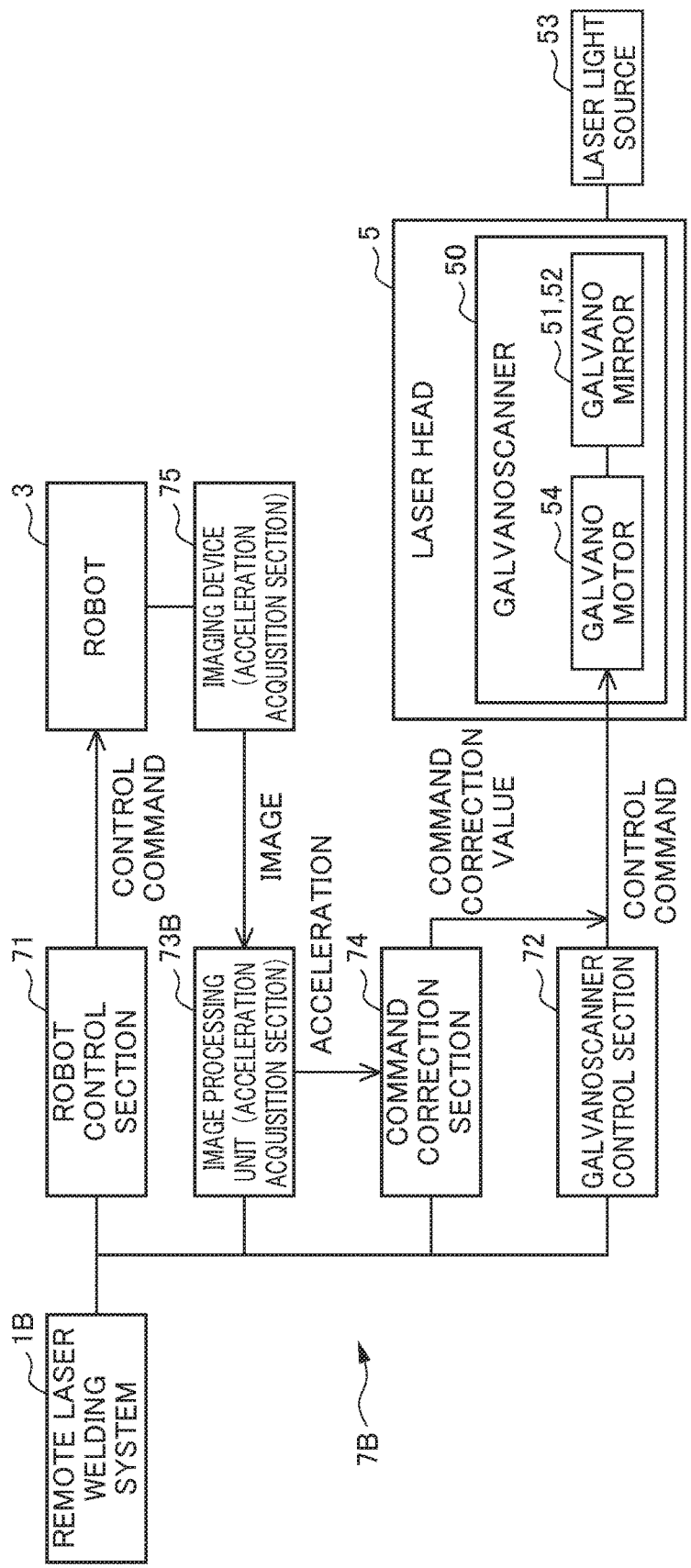
FIG. 7 is a functional block diagram of a laser welding system according to a third embodiment.

FIG. 7 is a functional block diagram of a remote laser welding system 1B according to a third embodiment. As shown in FIG. 7, the remote laser welding system 1B according to the present embodiment is the same configuration as the first embodiment, except for the configuration of the acceleration acquisition section of the control unit 7B differing compared to the remote laser welding system 1 according to the first embodiment. More specifically, the remote laser welding system 1B according to the present embodiment differs from the first embodiment in the point of including an imaging device 75 and image processing unit 73B in place of the acceleration sensor 73, as the acceleration acquisition section.

The imaging device 75 captures a picture of the multi-axis robot 3 or the multi-axis robot and the surroundings thereof. More specifically, the imaging device 75 is configured by an optical sensor such as a camera. The image processing unit 73B processes images captured by the aforementioned imaging device 75. More specifically, the changes in the images captured by the imaging device 75 are analyzed. The acceleration acquisition section of the present embodiment thereby calculates and acquires the acceleration of vibrations from the changes in images captured every predetermined time period.

The remote laser welding system 1B according to the present embodiment operates similarly to the remote laser welding system 1 according to the first embodiment, and thus similar effects are exerted.

Fourth Embodiment

Figure 8:
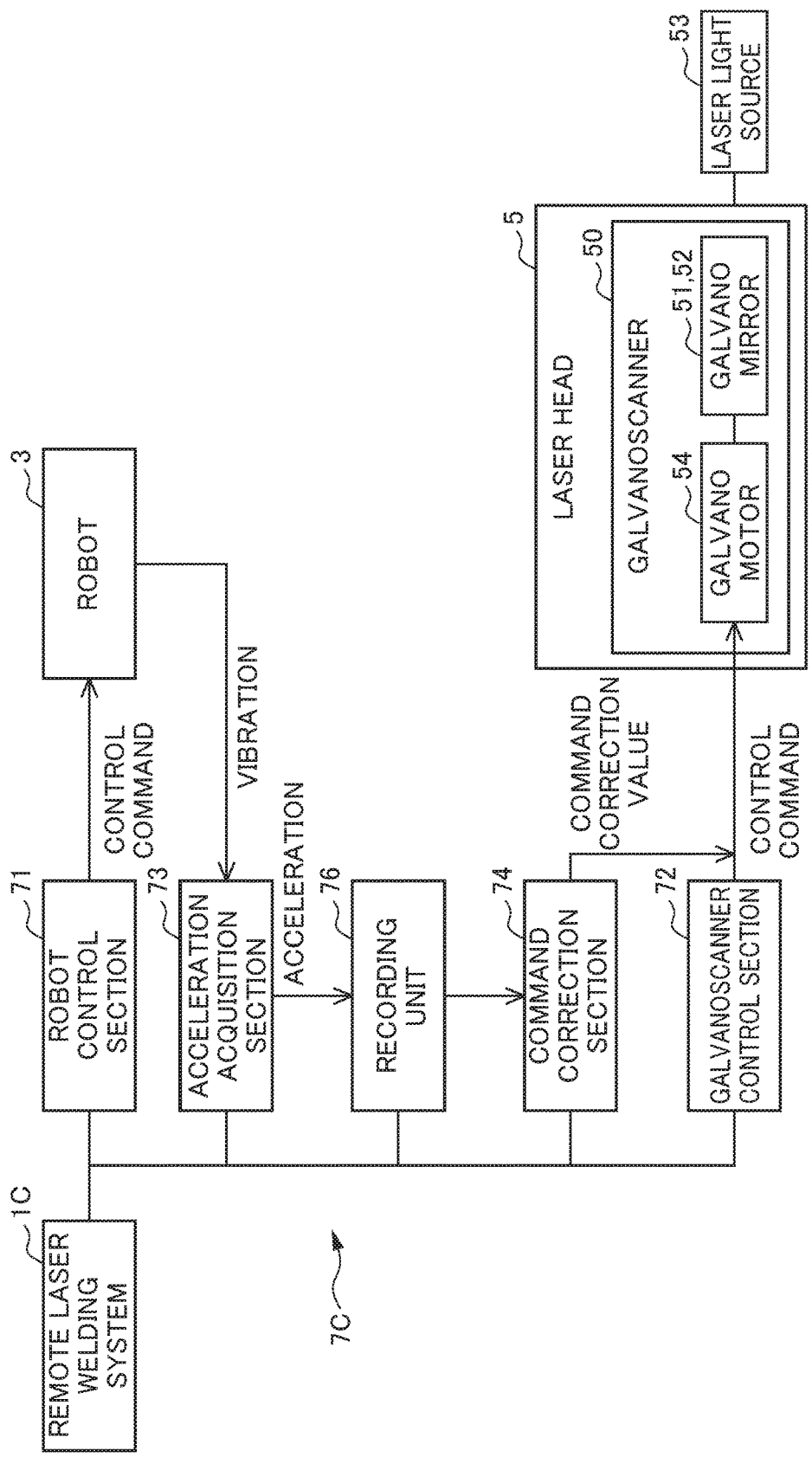
FIG. 8 is a functional block diagram of a laser welding system according to a fourth embodiment.

FIG. 8 is a functional block diagram of a remote laser welding system 1C according to a fourth embodiment. As shown in FIG. 8, the remote laser welding system 1C according to the present embodiment is the same configuration as the first embodiment except for differing in the point of the control unit 7C including a recording unit 76, compared to the remote laser welding system 1 according to the first embodiment. It should be noted that the acceleration acquisition section of the present embodiment can be configured by the aforementioned electrical current sensor 73A, or imaging device 75 and image processing unit 73B, in addition to the acceleration sensor 73.

The recording unit 76 acquires in advance and records the acceleration of vibrations occurring at the leading end of the arm 31 of the multi-axis robot 3. In other words, contrary to the aforementioned first to third embodiments, the acceleration of vibrations are acquired by experiments performed in advance, and recorded to be associated with a welding processing program executed by the remote laser welding system 1C. Without acquiring the acceleration of vibrations during laser welding, the present embodiment extracts the acceleration of vibrations from the recording unit 76 according to the welding processing program executed by the remote laser welding system 1C, and calculates a command correction value by the command correction section based on this to correct the galvanoscanner control command.

The remote laser welding system 1C according to the present embodiment exerts similar effects as the remote laser welding system 1 according to the first embodiment.

It should be noted that the present invention is not to be limited to the aforementioned respective embodiments, and that modifications and improvements within a scope that can achieve the object of the present invention are also included in the present invention. Although the aforementioned respective embodiments use automobile bodies as the workpiece W, it is not limited thereto, and it is possible to use various other workpieces. In addition, although the aforementioned respective embodiments use a galvanoscanner including two galvano mirrors, it is not limited thereto, and it is possible to use a galvanoscanner including one, three or more galvano mirrors.

EXPLANATION OF REFERENCE NUMERALS 1, 1A, 1B, 1C remote laser welding system (laser welding system)
3 multi-axis robot (robot)
5 laser head
7, 7A, 7B, 7C control unit
31 arm
50 galvanoscanner
51, 52 galvano mirror (mirror)
53 laser light source
54 galvano motor (motor)
71 robot control section (control unit)
72 galvanoscanner control section (control unit)
73 acceleration sensor (acceleration acquisition section)
73A electric current sensor (acceleration acquisition section)
73B image processing unit (acceleration acquisition section)
74 command correction section
75 imaging device (acceleration acquisition section)
76 recording unit
L laser beam
W workpiece

What is claimed is:

1. A laser welding system comprising a robot, a laser head provided to a leading end of an arm of the robot, a control unit that controls operations of the robot and the laser head, and a laser light source that generates a laser beam,
wherein the laser head includes: at least one mirror which is configured to be rotatable around a rotation axis, and reflects the laser beam; and
a motor that rotationally drives the mirror, and
wherein the control unit includes: an acceleration acquisition section that acquires acceleration of vibration occurring at the leading end of the arm due to operation of the robot and
a command correction section that corrects a control command to the motor which rotationally drives the mirror so as to suppress divergence of a laser beam irradiation position due to the vibration, based on the acceleration of the vibration acquired by the acceleration acquisition section,
the laser welding system further comprising an electric current sensor that detects drive current of a motor driving the robot,
wherein the acceleration acquisition section is configured to include the electric current sensor, and calculates the acceleration of the vibration from the drive current detected by the electric current sensor.

2. The laser welding system according to claim 1, further comprising a recording unit that acquires in advance and records the acceleration of the vibration,
wherein the command correction section corrects a control command to the motor which rotationally drives the mirror, based on the acceleration of the vibration recorded in advance in the recording unit.

3. A laser welding system comprising a robot, a laser head provided to a leading end of an arm of the robot, a control unit that controls operations of the robot and the laser head, and a laser light source that generates a laser beam,
wherein the laser head includes: at least one mirror which is configured to be rotatable around a rotation axis, and reflects the laser beam; and
a motor that rotationally drives the mirror, and
wherein the control unit includes: an acceleration acquisition section that acquires acceleration of vibration occurring at the leading end of the arm due to operation of the robot and
a command correction section that corrects a control command to the motor which rotationally drives the mirror so as to suppress divergence of a laser beam irradiation position due to the vibration, based on the acceleration of the vibration acquired by the acceleration acquisition section,
the laser welding system further comprising:
an imaging device that captures an image of the robot, or the robot and surrounding thereof; and
an image processing unit that processes an image captured by the imaging device,
wherein the acceleration acquisition section is configured to include the imaging device and the image processing unit, and calculates the acceleration of the vibration from a change in images captured every predetermined time period.

4. The laser welding system according to claim 3, further comprising a recording unit that acquires in advance and records the acceleration of the vibration,
wherein the command correction section corrects a control command to the motor which rotationally drives the mirror, based on the acceleration of the vibration recorded in advance in the recording unit.

* * * * *